United States Patent
Matsunagi et al.

(10) Patent No.: US 7,945,720 B2
(45) Date of Patent: May 17, 2011

(54) TERMINAL APPARATUS AND METHOD FOR CONTROLLING PROCESSING OF AN INTERRUPT EVENT

(75) Inventors: Naohiro Matsunagi, Tokyo (JP); Haruhisa Takayanagi, Tokyo (JP); Hiroyuki Kuriko, Tokyio (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 370 days.

(21) Appl. No.: 12/001,887

(22) Filed: Dec. 12, 2007

(65) Prior Publication Data

US 2008/0177921 A1    Jul. 24, 2008

(30) Foreign Application Priority Data

Jan. 18, 2007 (JP) ................................ 2007-008781

(51) Int. Cl.
    *G06F 13/24*    (2006.01)
(52) U.S. Cl. ...................................................... 710/264
(58) Field of Classification Search .......... 710/260–269, 710/58–62; 455/418–420
    See application file for complete search history.

(56) References Cited

U.S. PATENT DOCUMENTS

| | | | | |
|---|---|---|---|---|
| 5,408,528 A * | 4/1995 | Carlson et al. | ........... | 379/211.02 |
| 6,259,692 B1 * | 7/2001 | Shtivelman et al. | .......... | 370/352 |
| 6,314,365 B1 * | 11/2001 | Smith | ........................... | 701/200 |
| 6,456,706 B1 * | 9/2002 | Blood et al. | ................... | 379/188 |
| 7,465,865 B2 * | 12/2008 | Terao | ............................... | 84/600 |
| 7,693,509 B2 * | 4/2010 | Miyata | ........................ | 455/414.1 |
| 2002/0137551 A1 * | 9/2002 | Toba | ........................... | 455/566 |
| 2004/0023646 A1 * | 2/2004 | Inami et al. | ..................... | 455/418 |
| 2007/0266191 A1 * | 11/2007 | Schnepp et al. | ............. | 710/264 |
| 2008/0005738 A1 * | 1/2008 | Imai et al. | ..................... | 718/100 |
| 2008/0125179 A1 * | 5/2008 | Hamada et al. | ............... | 455/566 |

FOREIGN PATENT DOCUMENTS

| | | |
|---|---|---|
| JP | 2002-111805 | 4/2002 |
| JP | 2003-134226 | 5/2003 |
| JP | 2003-157217 | 5/2003 |
| JP | 2004-15717 | 1/2004 |
| JP | 2004-078936 | 3/2004 |
| WO | WO 2006/040794 | 4/2006 |

* cited by examiner

*Primary Examiner* — Raymond N Phan
(74) *Attorney, Agent, or Firm* — Cohen Pontani Lieberman & Pavane LLP

(57) ABSTRACT

In a terminal apparatus, the central control section 1-10 judges whether or not a function accompanied with an audio output is in operation when a change in a folding opening/closing state of the terminal apparatus is detected by the folding open/close detecting section 1-6, and changes the priority of the function in operation while maintaining the audio output of the function in operation when the function accompanied with the audio output being in operation is judged. Then, the system controls a reporting method reporting that the interrupt event is generated, based on the priority of an operating state in the terminal apparatus and the priority of the changed interrupt event, when the interrupt event is generated.

6 Claims, 11 Drawing Sheets

1-9-1

| OPERATING STATE | USE CONDITIONS | | | | | |
|---|---|---|---|---|---|---|
| | INITIAL SETTING | | FOLDING DEVICE IS CLOSED | | 5-MINUTE NO OPERATION | |
| | PRIORITY | FLAG | PRIORITY | FLAG | PRIORITY | FLAG |
| IDLE STATE | 1 | ON | — | — | — | — |
| ADDRESS BOOK FUNCTION IN OPERATION | 2 | OFF | — | — | — | — |
| MUSIC REPLAY FUNCTION IN OPERATION | 3 | OFF | 1 | OFF | 1 | OFF |
| TV BROADCASTING OUTPUT FUNCTION IN OPERATION | 3 | OFF | 1 | OFF | 1 | OFF |
| DYNAMIC IMAGE FUNCTION IN OPERATION | 3 | OFF | 1 | OFF | 1 | OFF |

| OPERATING STATE | USE CONDITIONS | | | | | |
|---|---|---|---|---|---|---|
| | INITIAL SETTING | | FOLDING DEVICE IS CLOSED | | 5-MINUTE NO OPERATION | |
| | PRIORITY | FLAG | PRIORITY | FLAG | PRIORITY | FLAG |
| IDLE STATE | 1 | ON | — | — | — | — |
| ADDRESS BOOK FUNCTION IN OPERATION | 2 | OFF | — | — | — | — |
| MUSIC REPLAY FUNCTION IN OPERATION | 3 | OFF | 1 | OFF | 1 | OFF |
| TV BROADCASTING OUTPUT FUNCTION IN OPERATION | 3 | OFF | 1 | OFF | 1 | OFF |
| DYNAMIC IMAGE FUNCTION IN OPERATION | 3 | OFF | 1 | OFF | 1 | OFF |

| INTERRUPT EVENT | PRIORITY |
|---|---|
| VOICE INCOMING CALL | 4 |
| E-MAIL INCOMING CALL | 3 |
| TIME ALARM | 2 |

| PRIORITY CONDITIONS | PROCESSING CONTENTS |
|---|---|
| WHEN INTERRUPT EVENT IS MORE IMPORTANT THAN OPERATING STATE | REPORTING SCREEN DISPLAY + REPORTING SOUND OUTPUT |
| WHEN INTERRUPT EVENT IS LESS IMPORTANT THAN OPERATING STATE | NOT REPORTING |
| WHEN OPERATING STATE AND INTERRUPT EVENT ARE EQUALLY IMPORTANT | REPORTING MARK DISPLAY |

| ID | ALARM TIME |
|---|---|
| 1 | 10:10 ON OCTOBER 10, 2007 |
| 2 | 11:11 ON OCTOBER 11, 2007 |
| 3 | 12:12 ON OCTOBER 12, 2007 |

TERMINAL APPARATUS AND METHOD FOR CONTROLLING PROCESSING OF AN INTERRUPT EVENT

CROSS-REFERENCE TO RELATED APPLICATION

This application is based upon and claims the benefit of priority from the prior Japanese Patent Application No. 2007-008781, filed Jan. 18, 2007, the entire contents of which is incorporated herein by reference.

BACKGROUND OF THE INVENTION

1. Field of the Invention

The present invention relates to a terminal apparatus that controls processing on an interrupt event, based on the priority of an operating state in the terminal apparatus and the priority of the interrupt event, when the interrupt event is generated, and a control program thereof.

2. Description of the Related Art

In electronic devices such as cellular phones (equivalent to terminal apparatus), when events called interrupt events such as voice incoming call, e-mail incoming call, and time alarm are generated, processing on an interrupt event is controlled in response to an operating state of the electronic device.

Generally, when the operating state of the electronic device is a functional operation, the event is controlled, so as not to allow the interrupt event to disturb the operation of the function, such that the interrupt event deemed less important than the function in operation is reported to a user by merely displaying a small mark, kept reserved instead of letting the interrupt event interrupt the function in operation, and reported once again to the user when the operation of the function is terminated or not reported to the user.

As such a conventional art, one is disclosed in, for example, Japanese Laid-Open (Kokai) Patent Publication No. 2004-015717. In the technology disclosed in the publication, there is proposed a cellular phone with a preferential control function that suspends the operation of a function in execution to preferentially operate an interrupted function, when the interrupt of a function of higher priority (importance) than the function in operation (interrupt event) is generated.

In recent years, functions accompanied with audio outputs such as music replay function, dynamic image function, and television set and radio broadcast output function are equipped with electronic devices such as cellular phones. One example for controlling processing on interrupt events in such electronic devices is taken up. When interrupt events of voice incoming call, e-mail incoming call, and time alarm are generated while the operating state is in idle state, the interrupt events are deemed more important than the idle state and they are reported with the sound and screen display.

In addition, when the operating state is a state of a music replay function in operation, controls are performed such that the voice incoming call is deemed more important than the music replay and reported with the sound and screen display, the e-mail incoming call is deemed as important as the music replay and reported by merely displaying the mark of an e-mail, and the time alarm is deemed less important than the music replay and kept reserved to be reported with the sound and screen display when the music replay function is terminated.

In the case of the function accompanied with the audio output as mentioned above, a user does not necessarily use the cellular phone by focusing on the function. For example, in the case of a folding open/close-type electronic device, the user may fold the electronic device and put it into the cloth pocket and walk outdoors while merely listening to the audio of a TV (television) broadcast or a radio broadcast with an earphone connected to the electronic device. Under such circumstances, the function is less important compared to a case that the user uses the electronic device by focusing on a certain function. Namely, interrupt events that are deemed better reported to the user more increase than when using the electronic device by focusing on a certain function.

For example, when the user uses the electronic device by focusing on a TV broadcasting output function (listening to the audio while watching a TV screen on the electronic device), the TV broadcasting output function is more important than the time alarm. On the contrary, when the user uses the electronic device without focusing on a certain function (merely listening to the audio), the time alarm should be reported even when the TV broadcasting output function is in operation. Further, when the importance of two functions is almost equal, an event may be reported by merely displaying an e-mail mark as in the aforementioned e-mail incoming call, and the user may not possibly notice such a report because the electronic device is in a folded position and the user does not watch a screen thereof.

However, the above-described related art (refer to Japanese Laid-Open (Kokai) Patent Publication No. 2004-015717) has a problem that the generation of an interrupt event can not be adequately reported to the user in response to a condition that the user uses the electronic device, because the related art simply controls the operations of a function in execution and a function that interrupts the function in execution in accordance with the priority of functions.

SUMMARY OF THE INVENTION

The present invention has been conceived in light of the foregoing situations, and is to provide a terminal apparatus capable of more flexibly and more adequately reporting the generation of interrupt events in response to use conditions of the terminal apparatus and a control program thereof.

In order to achieve the above-described purpose, in accordance with one aspect of the present invention, there is provided a terminal apparatus for controlling processing on an interrupt event, based on a priority of a detected operating state of the terminal apparatus and a priority of the interrupt event, after detecting the operating state of the terminal apparatus, when the interrupt event is generated, comprising: a detecting means for detecting changes in use conditions of the terminal apparatus; a judging means for judging whether or not a function accompanied with an audio output is in operation, when the changes in the use conditions are detected by the detecting means; and a priority changing means for changing the priority of the function in operation while maintaining the audio output of the function in operation, when the function accompanied with the audio output is judged to be in operation by the judging means.

In accordance with another aspect of the present invention, there is provided a computer-readable storage medium having a program of a terminal apparatus stored thereon that is executable by a computer for controlling processing on an interrupt event, based on the priority of a detected operating state of the terminal apparatus and the priority of an interrupt event, after detecting the operating state of the terminal apparatus, when the interrupt event is generated, comprising: a detection processing step of detecting a change in use conditions of the terminal apparatus; a judging processing step of judging whether or not a function accompanied with an audio output is in operation, when a change in the use conditions is detected; and a priority change processing step of changing the priority of a function in operation while maintaining the audio output of the function in operation, when the function accompanied with the audio output is judged to be in operation.

According to the present invention, an advantage that the generation of an interrupt event can be more flexibly and more adequately reported to a user in response to the use conditions of the terminal apparatus.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a conceptual diagram showing a data structure of an operating state priority memory section 1-9-1;

FIG. 4 is a conceptual diagram showing a data structure of an interrupt event priority memory section 1-9-2;

FIG. 5 is a conceptual diagram showing a data structure of an interrupt event processing content memory section 1-9-3;

FIG. 6 is a conceptual diagram showing a data structure of a time alarm memory section 1-9-4;

DETAILED DESCRIPTION OF THE PREFERRED EMBODIMENTS

The present invention will hereinafter be described in detail with reference to the preferred embodiments shown in the accompanying drawings.

A. Structure of Embodiment

Figure 1:
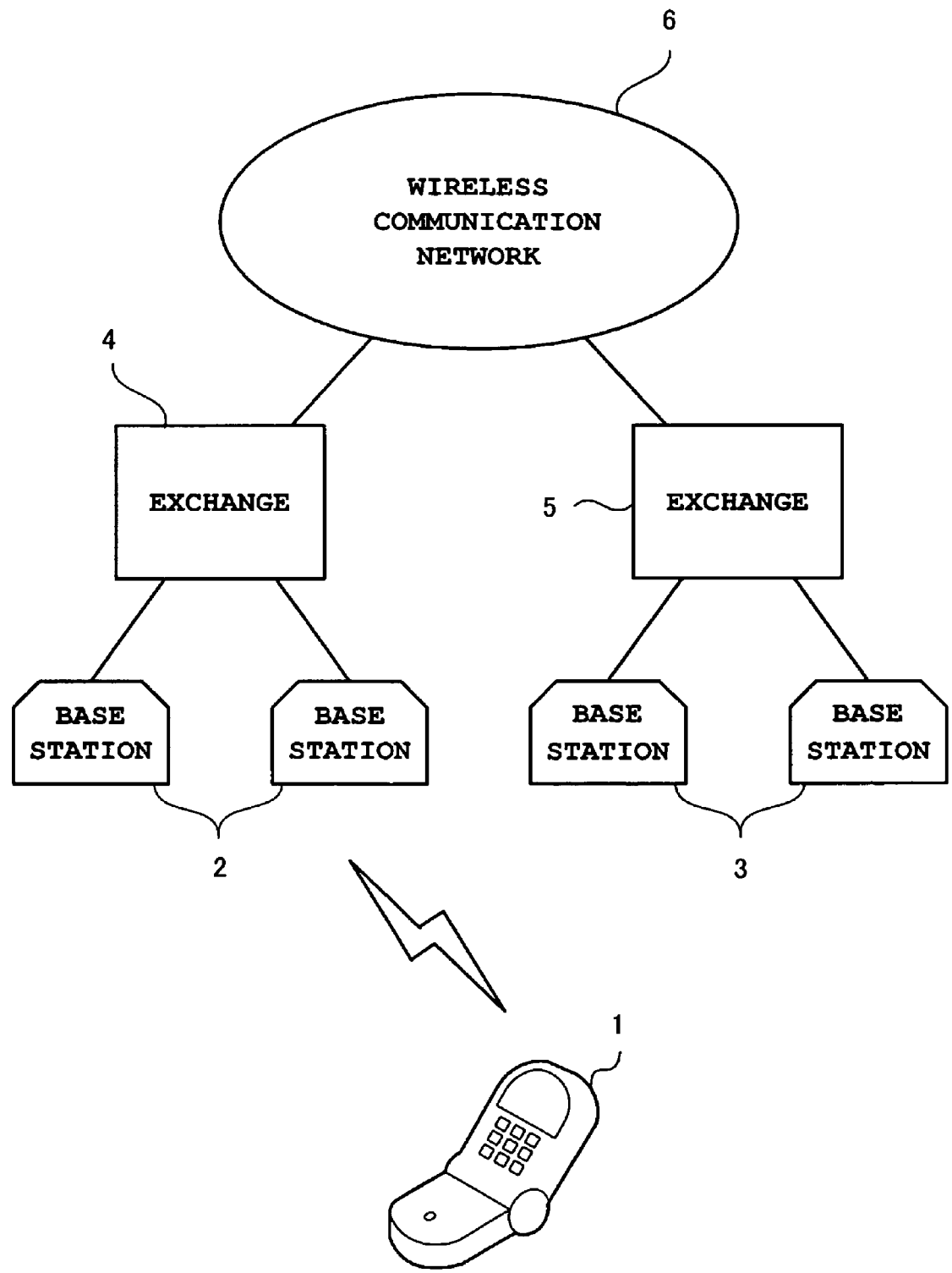
FIG. 1 is a block diagram showing a system structure including mobile communication terminals such as cellular phones according to an embodiment of the present invention.

FIG. 1 is a block diagram showing a system structure including mobile communication terminals (terminal apparatus) such as cellular phones according to the embodiment of the present invention.

In FIG. 1, the mobile communication terminal 1 (terminal apparatus) consist of, for example, a cellular phone and the like. The mobile communication terminal 1 is connected to exchanges 4, 5 (that is, transit exchanges, computerized digital switching facility) through base stations 2, 3, and is mutually communicable through the exchanges 4, 5 and a wireless network 6.

Figure 2:
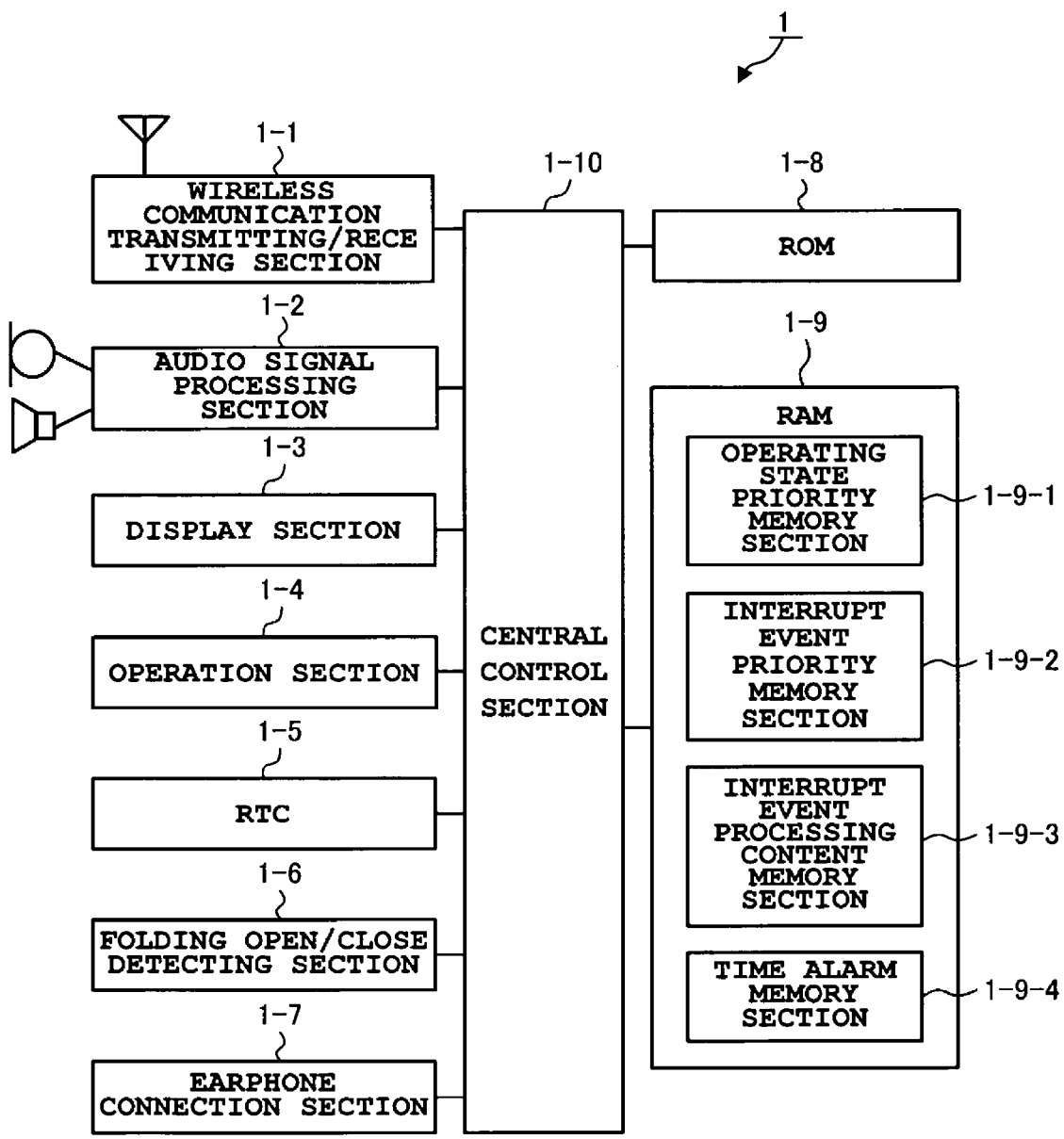
FIG. 2 is a block diagram showing a structure of a communication terminal 1 according to the embodiment.

Next, FIG. 2 is a block diagram showing a structure of the mobile communication terminal 1 according to the embodiment. In FIG. 2, the mobile communication terminal 1 includes a wireless communication transmitting/receiving section 1-1, a voice signal processing section 1-2, a display section 1-3, an operation section 1-4, RTC 1-5, a folding open/close detecting section 1-6, an earphone connection section 1-7, ROM 1-8, RAM 1-9, and a central control section 1-10. The wireless communication transmitting/receiving section 1-1 performs the voice communication, various data transmittance/reception and the like.

The voice signal processing section 1-2 picks up voices from a microphone, converts them into digital signals and supplies the same to the central control section 1-10 while converting the voice signals into analog signals and outputting them from a speaker. The display section 1-3 includes a liquid crystal display and the like, and displays various messages, images and the like. The operation section 1-4 inputs telephone numbers, various data, operation commands and the like. RTC 1-5 clocks real times.

The folding open/close detecting section 1-6 detects the opening/closing of the mobile communication terminal 1 with a magnetic detection from a magnet situated at a predetermined position in the main body. An unillustrated earphone is connected to the earphone connection section 1-7, for example, to listen to the audio outputted by the music replay function or the TV broadcasting output function. Note that the concept of "audio" includes voice and/or sound. ROM 1-8 stores predetermined programs, various parameters and the like. RAM 1-9 stores various data. Particularly, in the embodiment, RAM 1-9 is provided with the operating state priority memory section 1-9-1, the interrupt event priority memory section 1-9-2, the interrupt event processing content memory section 1-9-3, and the time alarm memory section 1-9-4.

The operating state priority memory section 1-9-1, as shown in FIG. 3, stores flags showing a priority in response to use conditions and in which operating state and what use conditions a mobile communication terminal is at present by a major operating state in the mobile communication terminal 1. Note that the concept of "priority" includes all the similar concepts such as "importance". As operating states, an idle state, an address book function in operation, a music creation function in operation, a TV broadcasting output function in operation, and a dynamic image replay function in operation are assumed. In addition, as use conditions, "initial setting", "folding device is closed" showing that a folding mechanism is closed, and "5-minute no operation" showing that a state in which no operation is performed continues for 5 minutes are assumed. As for priority, the bigger the figure is, the higher the priority is.

Because the idle state and the address book function in operation are each a function without an audio output, the priority remains unchanged even when the use conditions are changed to "folding device is closed" or "5-minute no operation". On the contrary, because the music replay function in operation, the TV broadcasting output function in operation, and the dynamic image replay function in operation are each a function accompanied with an audio output, when the use conditions are changed to "folding device is closed" or "5-minute no operation", the priority is lowered to the lowest.

In addition, the item that is the priority mentioned above is equivalent to a concept that is the priority.

Next, the interrupt event priority memory section 1-9-2, as shown in FIG. 4, stores the priority by interrupt event. As interrupt events, a voice incoming call, an e-mail incoming call, and a time alarm are assumed, and each priority is numbered as "4", "3", and "2" in order.

Next, the interrupt event processing content memory section 1-9-3, as shown in FIG. 5, stores the processing contents showing what kinds of processing (report processing) should be performed in response to the priority of a current operating state and that of an interrupt event, when the interrupt event is generated. Namely, when the interrupt event is more important than the operating state, a report screen display and a report audio output are performed, when the interrupt event is less important than the operating state, no report is sent, and when the operating state and that of the interrupt event are equally important, a report mark is displayed.

Next, the time alarm memory section 1-9-4, as shown in FIG. 6, stores each alarm time (time/date) that actuates an alarm. An ID is given to each alarm time. In an illustrated example, the ID "1" is registered at 10:10 on Oct. 10, 2007, the ID "2" is at 11:11 on Oct. 11, 2007, and the ID "3" is at 12:12 on Oct. 12, 2007 to issue an alarm sound, respectively.

The central control section 1-10 executes programs stored in ROM 1-8 to control operations of each section. Particularly, in the embodiment, the central control section 1-10 changes the priority of a function in operation if the function accompanied with an audio output is in operation, when a change in the use conditions of the mobile communication terminal 1 is detected. In addition, this section controls a report operation that reports the generation of the interrupt event, based on the priority of operating state of the mobile communication terminal and that of the interrupt event after detecting the operating state of the mobile communication terminal 1, when the interrupt event is generated.

Here, the central control section 1-10 realizes the functions of a detecting means, a judging means, and a priority changing means.

B. Operations of Embodiment

Next, the above-described operations of the embodiment will hereinafter be explained in detail.

(Main Routine)

Figure 7:
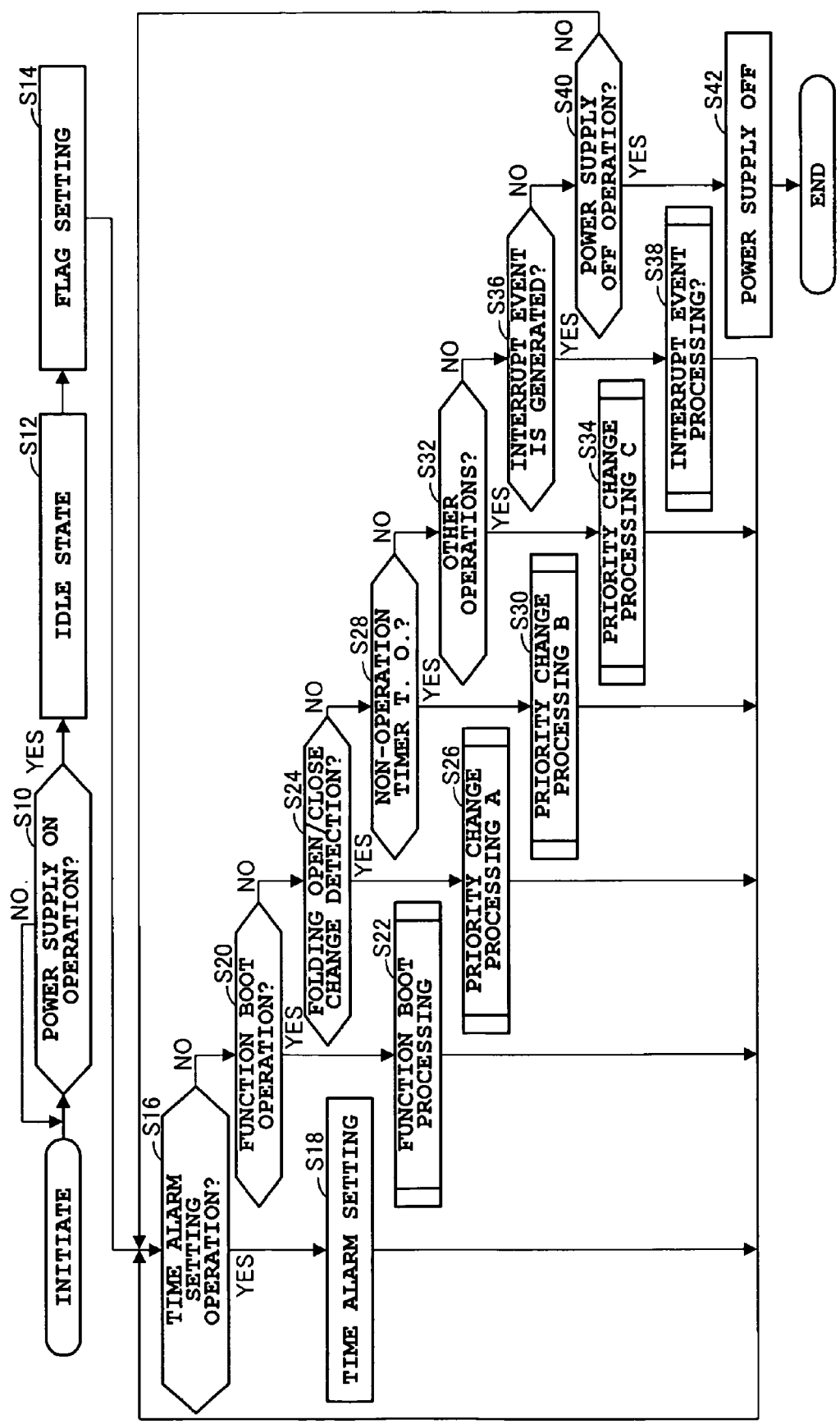
FIG. 7 is a flowchart for explaining operations of the mobile communication terminal 1 (main routine) according to the embodiment.

FIG. 7 is a flowchart for explaining operations of the mobile communication terminal 1 (main routine) according to the embodiment. In the first place, the system judges whether or not a power supply ON operation is performed by a user (Step S10), and when the power supply ON operation is performed, the system should be in an idle state (Step S12). Next, a flag of an initial setting in the idle state in the operating state priority memory section 1-9-1 is set at ON and flags other than the former are set at OFF (Step S14).

Next, the system judges whether or not a time alarm setting operation is performed (Step S16), and when the time alarm setting operation is performed, the alarm time set by the user is set in the alarm memory section 1-9-4 (Step S18). Then, it returns to Step S16. Meanwhile, when the time alarm setting operation is not performed, the system judges whether or not a function boot operation for booting an address book function, a music replay function, a TV broadcasting output function, or a dynamic image replay function is performed (Step S20). Then, when a function boot operation for booting any of the functions is performed, a function boot processing is executed (Step S22).

The details of the function boot processing are described later. However, a brief description is given here. In the function boot processing, the flag of the function in the operating state priority memory section 1-9-1 is set at ON/OFF in response to whether or not the booted function is a function accompanied with an audio output or an opening/closing state of the folding-type device, and the operation of the function is initiated. After the function boot processing is performed, it returns to Step S16.

Meanwhile, when the function boot processing operation is not performed, the system judges whether or not a change in an opening/closing of the folding-type device is detected by the folding opening/closing detecting section 1-6 (Step S24). Then, when the change in the opening/closing of the folding device is detected, the priority change processing A is executed (Step S26). The details of the priority change processing A are described later. However, a brief description is given here. When a function accompanied with an audio output is in operation, a flag of "a folding device is closed" or "initial setting" of the function in operation in the operating state priority memory section 1-9-1 is set at ON/OFF (change of priority) in response to an opening/closing state of the folding device. Then, it returns to Step S16.

In addition, when a change in the opening/closing of the folding device is not detected, the system judges whether or not the non-operation timer is timed out (Step S28). The non-operation timer clocks an elapsed time during a period of no operation. Then, when the non-operation timer is timed out, namely when the non-operation state continues for a predetermined time or more (5 minutes or more in the embodiment), the priority change processing B is executed (Step S30). The details of the priority change processing B are described later. However, a brief description is given here. When a function accompanied with an audio output is in operation, a flag of "5-minute no operation" of the function in operation in the operating state priority memory section 1-9-1 is set at ON and flags other than the former are set OFF (change of priority). Then, it returns to Step S16.

Meanwhile, when the non-operation timer is not timed out, the system judges whether or not other operations are performed (Step S32). As other operations, there are an operation for registering an address book, an operation for changing the volume of an outputted audio, an operation for changing channels of a TV set, or the like. Then, when other operations are performed, the priority change processing C is executed. The details of the priority change processing C are described later. However, a brief description is given here. When a function accompanied with an audio output is in operation, a flag of "initial setting" of a function in operation in the operating state priority memory section 1-9-1 is set at ON and flags other than the former are set at OFF (change of priority), and processings corresponding to operations are performed. Then, it returns to Step S16.

Meanwhile, when other operations are not performed, the system judges whether or not an interrupt event is generated (Step S36). Then, when the interrupt event is generated, interrupt event processing is executed (Step S38). The details of the interrupt event processing are described later. However, a brief description is given here. The priority of a function currently in operation with that of the interrupt event are compared, operations of the function in operation in response to the comparison results are controlled, and a reporting operation that reports the generation of the interrupt event is controlled. Then, it returns to Step S16.

Meanwhile, when an interrupt event is not generated, the system judges whether or not a power supply OFF operation is performed (Step S40), and when the power supply OFF operation is performed, a power supply is turned OFF (Step S42) to terminate the processing. On the contrary, when the power supply OFF operation is not performed, nothing is performed, and it returns to Step S16.

(Function Boot Processing)

Figure 8:
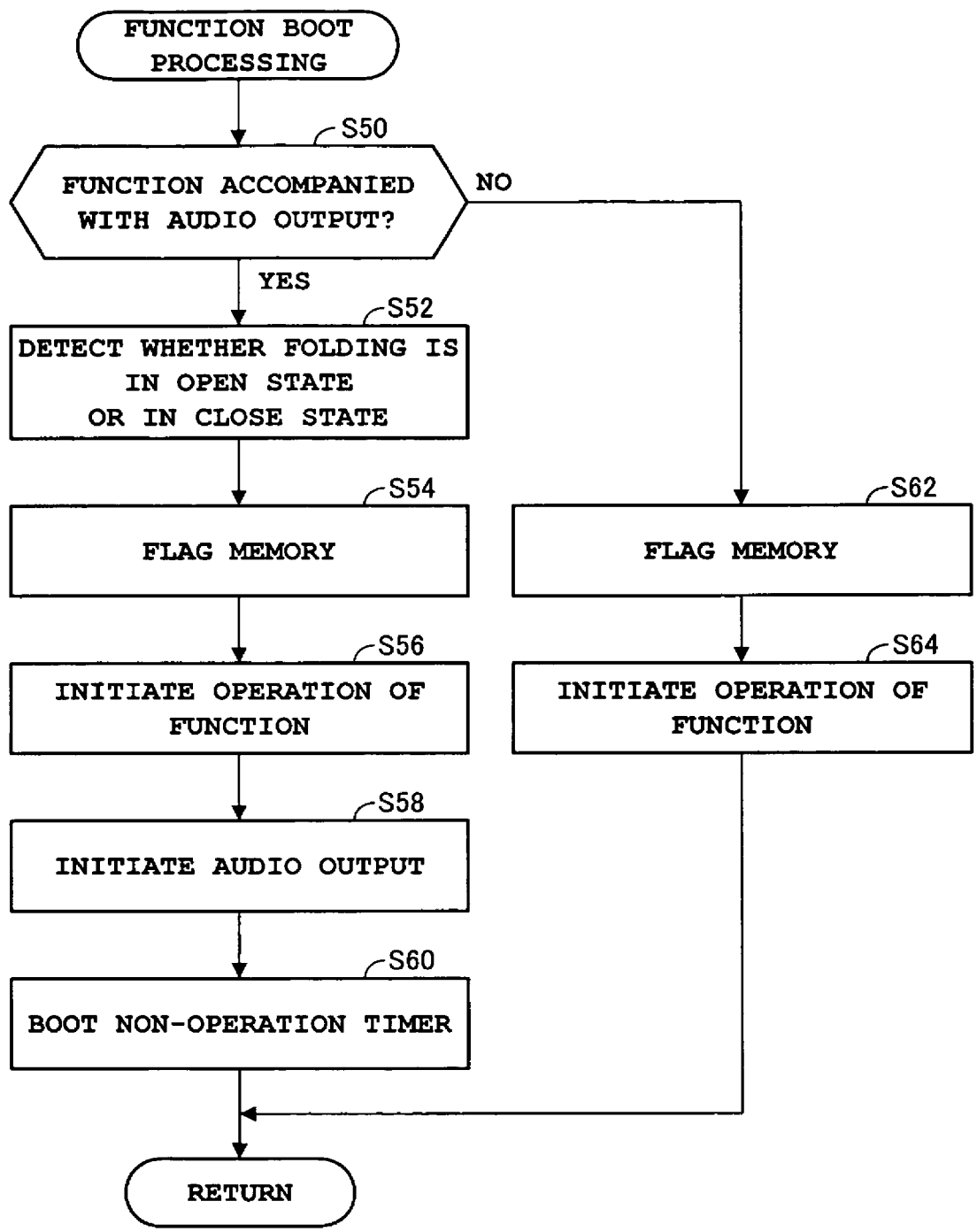
FIG. 8 is a flowchart for explaining operations of a function boot processing.

Next, FIG. 8 is a flowchart for explaining operations of the above-described function boot processing. In the function boot processing, in the first place, the system judges whether or not a booted function is each a function accompanied with audio outputs such as music replay, TV broadcasting output, and dynamic images replay (Step S50). Then, when the booted function is a function accompanied with an audio output, whether a folding device is in open state or close state is detected (Step S52).

Then, when the folding device is in an open state, a flag of "initial setting" of a function that is to be booted is set at ON. When the folding-type device is in a closed state, a flag of "folding device is closed" of a function that is to be booted is set at ON, and flags other than the former are set at OFF (Step S54). Next, the operation of the booted function is initiated (Step S56), an audio output is initiated (Step S58), and the non-operation timer is operated (for 5 minutes) (Step S60). Then, it returns to the main routine.

Meanwhile, when the booted function is not a function accompanied with an audio output, a flag of "initial setting" of a function that is to be booted is set at ON, flags other than the former are set at OFF (Step S62), and the operation of the booted function is initiated (Step S64). Then, it returns to the main routine.

(Priority Change Processing A)

Figure 9:
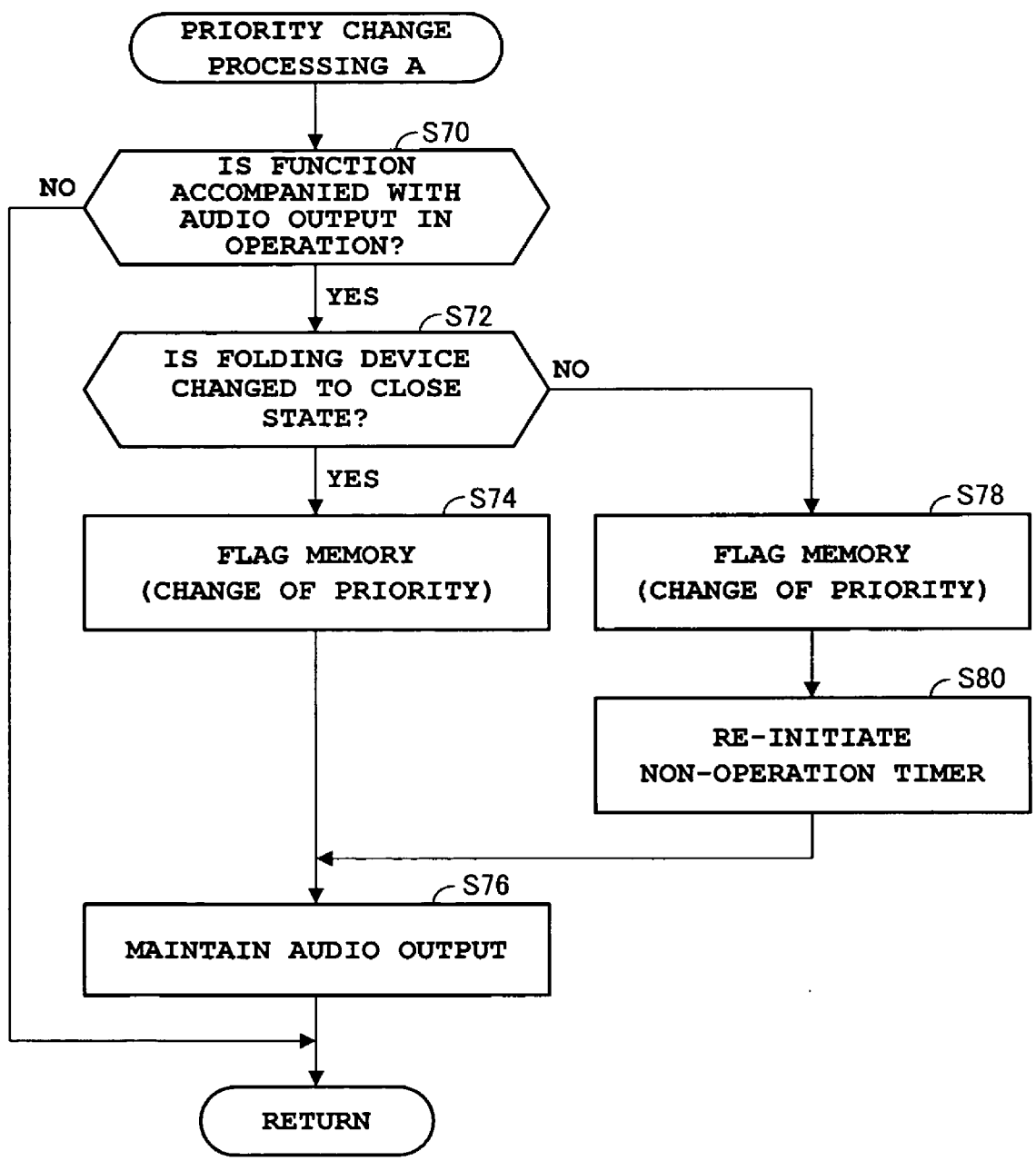
FIG. 9 is a flowchart for explaining operations of a priority change processing A.

Next, FIG. 9 is a flowchart for explaining the operation of the above-described priority change processing A. In the priority change processing A, in the first place, the system judges whether or not the function accompanied with an audio output is in operation (Step S70), when the function accompanied with an audio output is not in operation, nothing is performed, and it returns to the main routine. Meanwhile, when the function accompanied with an audio output is in operation, the system judges whether or not it is changed to a folding device in a closed state (Step S72). Then, when it is changed to the folding device in closed state, a flag of "folding device is closed" of the function in operation is set at ON and flags other than the former are set at OFF (change of priority) (Step S74). Next, the audio output is maintained as it stands (Step S76), and it returns to the main routine.

Meanwhile, when it is changed to a folding device in an open state, a flag of "initial setting" of the function in operation is set at ON, and flags other than the former are set at OFF (change of priority) (Step S78). Next, the non-operation timer is re-booted (Step S80). Then the audio output is maintained as it stands (Step S76), and it returns to the main routine.

(Priority Change Processing B)

Figure 10:
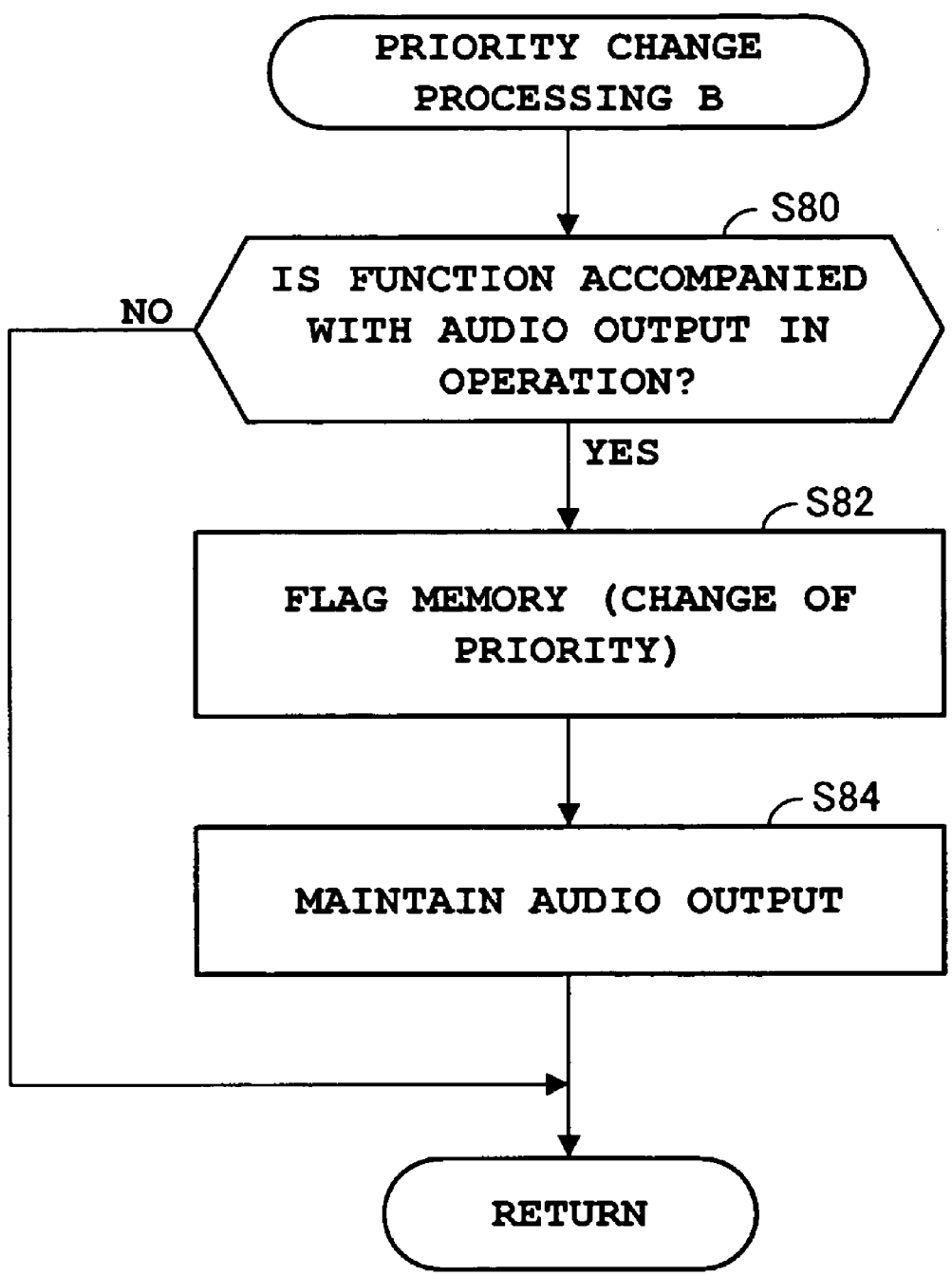
FIG. 10 is a flowchart for explaining operations of a priority change processing B.

Next, FIG. 10 is a flowchart for explaining the operations of the above-described priority change processing B. In the priority change processing B, the system judges whether or not the function accompanied with an audio output is in operation (Step S80). When the function accompanied with an audio output is not in operation, nothing is performed, and it returns to the main routine. Meanwhile, when the function accompanied with an audio output is in operation, a flag of "5-minute no operation" of the function in operation is set at ON and flags other than the former are set at OFF (change of priority) (Step S82). Then the audio output is maintained as it stands (Step S84), and it returns to the main routine.

(Priority Change Processing C)

Figure 11:
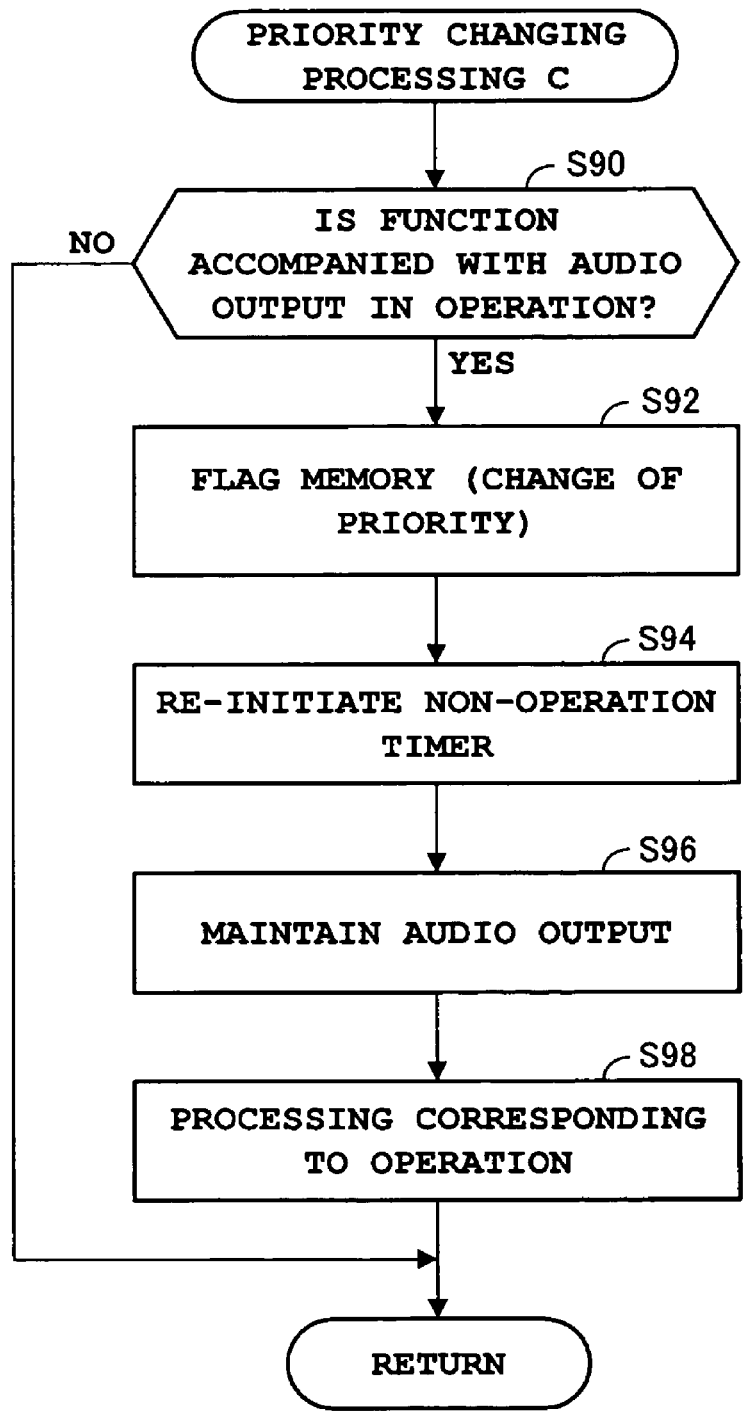
FIG. 11 is a flowchart for explaining operations of a priority change processing C.

Next, FIG. 11 is a flowchart for explaining the operations of the above-described priority change processing C. In the priority change processing C, in the first place, the system judges whether or not a function accompanied with an audio output is in operation (Step S90). When the function accompanied with an audio output is not in operation, nothing is performed, and it returns to the main routine. Meanwhile, when the function accompanied with an audio output is in operation, a flag of "initial setting" of the function in operation is set at ON and flags other than the former are set at OFF (change of priority) (Step S92). Next, the non-operation timer is re-booted (Step S94), and the audio output is maintained as it stands (Step S96). Then, processing corresponding to an operation is executed (Step S98), and it returns to the main routine.

(Interrupt Event Processing)

Figure 12:
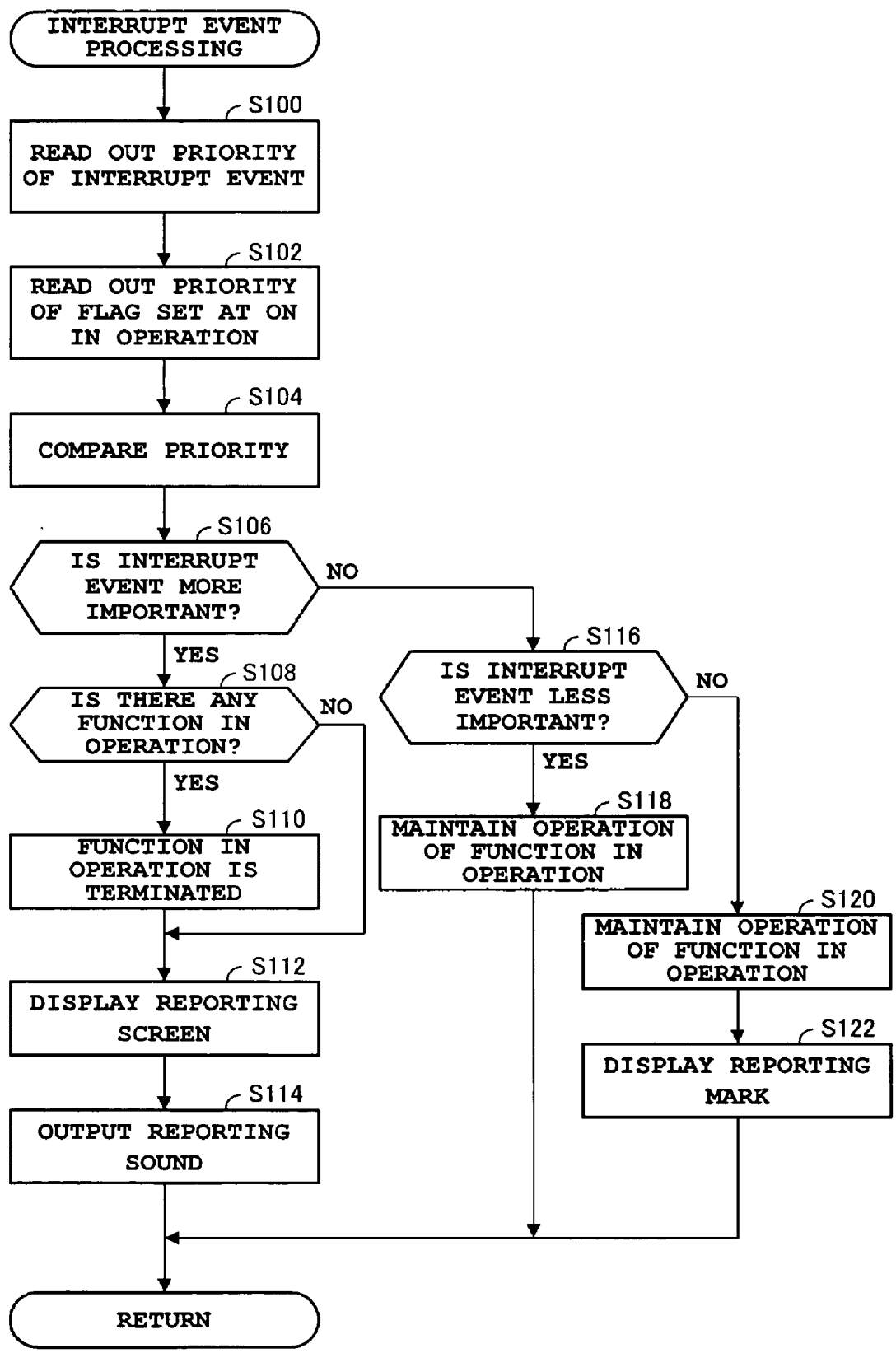
FIG. 12 is a flowchart for explaining operations of an interrupt event processing.

Next, FIG. 12 is a flowchart for explaining the operation of the above-described interrupt event processing. In the interrupt event processing, in the first place, the priority of an interrupt event is read out from the interrupt event priority memory section 1-9-2 (Step S100), and the priority of an operating state where the flag is set at ON is read out from the operating state priority memory section 1-9-1 (Step S102). Then, the priority of both sides are compared with each other (Step S104).

Figure 13A:
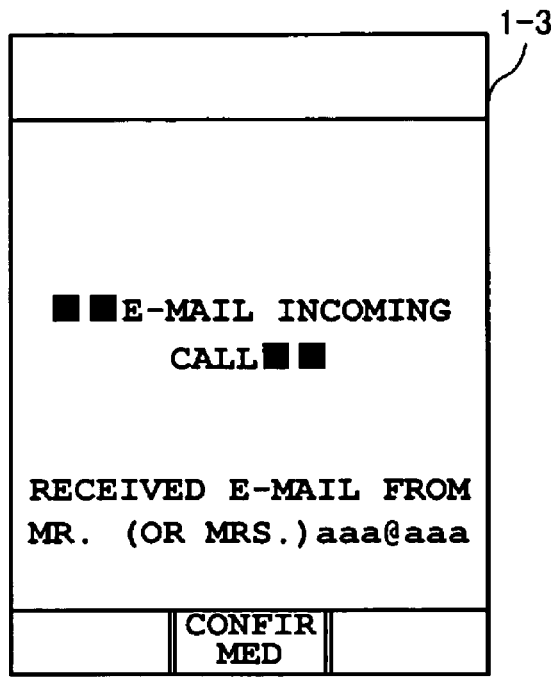
FIG. 13A and FIG. 13B are typical diagrams showing a report example of the interrupt event.

Next, the system judges whether or not the priority of the interrupt event is higher (Step S106), and when the priority of the interrupt event is higher, it judges whether or not there is any function in operation (Step S108). When there is any function in operation, the function in operation is terminated (Step S110). Next, a reporting screen for reporting that an interrupt event is generated is displayed (Step S112) as shown in FIG. 13A, and further, a reporting sound is outputted (Step S114). Then, it returns to the main routine. An example shown in FIG. 13A is a screen that reports an e-mail incoming call.

Meanwhile, when the priority of the interrupt event is not higher, the system judges whether or not the priority of the interrupt event is lower (Step S116). When the priority of the interrupt event is lower, the operation of the function in operation is maintained (Step S118), and it returns to the main routine without performing a report for reporting that an interrupt event is generated.

Figure 13B:
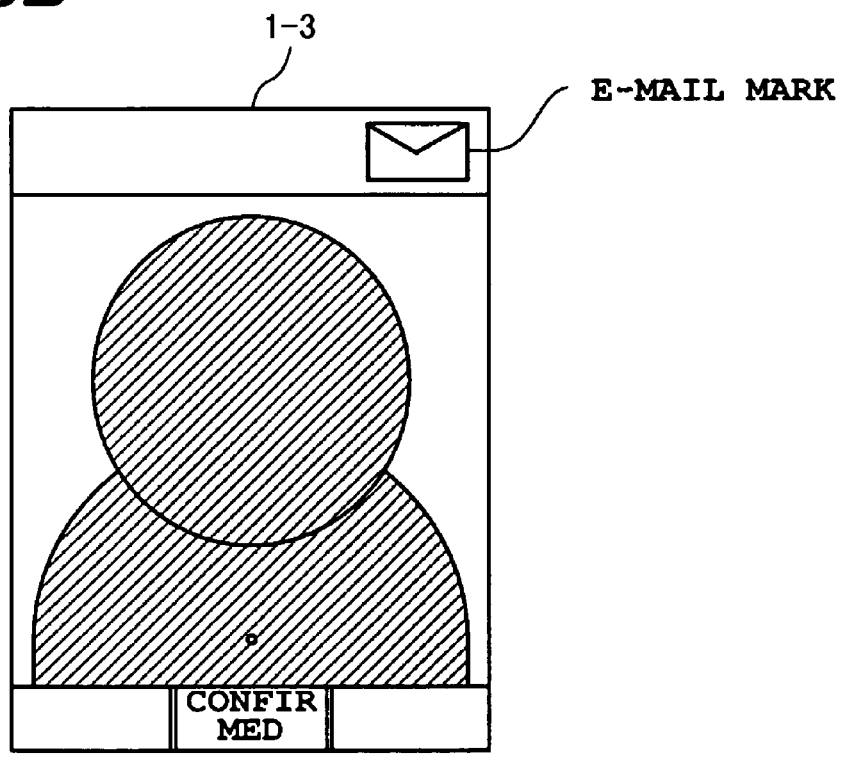

In addition, when the priority of the interrupt event is not lower, namely, when the priority of the interrupt event and that of the operating state are equal, the operation of the function in operation is maintained (Step S120). Then, a reporting mark corresponding to the interrupt event is displayed (an e-mail mark if it is an e-mail incoming call) (Step S122) as shown in FIG. 13B, and it returns to the main routine. An example shown in FIG. 13B is a screen on which an e-mail mark that reports an e-mail incoming call to a TV broadcasting output screen is displayed.

The concrete operating states will hereinafter be described in detail.

For example, when a TV broadcasting output function is booted from an idle state, if a folding device is in open state, a flag of "initial setting" of a function "TV broadcasting output function in operation" to be booted is set at ON to operate the TV broadcasting output function. This allows the priority of the TV broadcasting output function to be "3". Then, an audio output is also initiated to boot a non-operation timer.

Assuming that a voice incoming call is generated when a TV broadcast is watched with the mobile communication terminal 1 opened, in this case, an interrupt event processing is executed. Because the priority of the TV output function is "3" and that of the voice incoming call is "4" at this time, the priority of the interrupt event is higher. Therefore, the TV broadcasting output function in operation is forcibly terminated, a reporting screen showing that the voice incoming call is generated is displayed and a reporting sound is outputted. As a result, this allows a user to definitely notice the voice incoming call.

In addition, assuming that an e-mail incoming call is generated when a TV broadcast is watched with the mobile communication terminal 1 opened, in this case, because the priority of the TV broadcasting output function is "3" and that of the e-mail incoming call is also "3", the priority of both sides is equal. Therefore, with the operation of the TV broadcasting output function in operation maintained, a reporting mark showing that an e-mail incoming call is generated is displayed in the display section 1-3. As a result, this allows the user to notice the e-mail incoming call without disturbing a TV broadcast watching.

Similarly, when a time alarm is generated while a TV broadcast is watched with the mobile communication terminal 1, because the priority of the time alarm is "2", the priority of the interrupt event is lower. Therefore, in this case, the operation of the TV broadcasting output function in operation is maintained, and a report informing a user of the generation of the time alarm is not performed.

Meanwhile, when the user closes the mobile communication terminal 1 while watching a TV set, the priority change processing A is executed. In this case, because a TV broadcasting output function accompanied with an audio output is in operation and it is changed to a folding device in a closed state, a flag of "folding device in closed state" of the TV broadcasting output function is set at ON and flags other than the former are set at OFF. This allows the priority of the TV broadcasting output function to be "1".

When a voice incoming call is generated in this state (a state that only the sound is heard with an earphone), because the priority of the TV broadcasting output function is "1" and that of the sound incoming call is "4", the priority of the interrupt event is higher. Therefore, the TV broadcasting output function in operation is forcibly terminated, a reporting screen showing that a sound incoming call is generated is displayed and a reporting sound is outputted. As a result, this allows the user to definitely notice the voice incoming call.

In addition, when an e-mail incoming call is generated, because the priority of the TV broadcasting output function is "1" and that of the e-mail incoming call is "3", the priority of the interrupt event is higher. Therefore, the TV broadcasting output function in operation is forcibly terminated, a reporting screen showing that the e-mail incoming call is generated is displayed and a reporting sound is outputted. As a result, this allows the user to definitely notice the e-mail incoming call. The same thing also applies to a case that a time alarm is generated.

Thus, under the circumstances that a user folds the electronic device and holds it in a cloth pocket while walking outdoors and listening only to the audio of a TV broadcast with an earphone connected to the mobile communication terminal 1, the priority of the function in operation is lower than a case wherein the user concentratedly uses the electronic device. In such a case, the TV broadcasting output function is forcibly terminated and the generation of an interrupt event is reported to the user. This allows the user to definitely notice the generation of the interrupt event.

In addition, when functions such as TV broadcasting output functions accompanied with an audio output are in operation, the non-operation timer is booted. When the non-operation timer is timed out (when a non-operation state continues for 5 minutes) under this condition, it is highly likely that the user vaguely listens to the electronic device rather than to listen to it concentratedly and the priority of a function in operation is lower accordingly. In this case, the priority change processing B is executed, a flag of "5-minute no operation" of the TV broadcasting output function is set at ON (the priority is changed to "1") and flags other than the former are set at OFF. This allows the user to definitely notice the generation of the interrupt event by reporting the generation of the interrupt event as in a folded state of the electronic device.

In addition, while a function accompanied with an audio output, for example, a TV broadcasting output function in operation, when other operations such as change of sound volume and change of a channel are performed, it is considered that the user listens to the electronic device rather concentratedly. In this case, the priority change processing C is executed, a flag of "initial setting" of the TV broadcasting output function is set at ON (the priority is increased to "3") and flags other than the former are set at OFF. This allows the electronic device to perform a reporting operation as in a case that the mobile communication terminal 1 is opened.

According to the above-described embodiment, because the priority of a function accompanied with an audio output is changed in response to use conditions of the electronic device, when it is considered that the user does not use the function concentratedly, this allows the user to notice the generations of more interrupt events. Further, even when the priority is changed, because the audio output is maintained, convenience for the user is not damaged but is maintained.

In addition, when the folding device is closed (when the user is deemed to not use a function accompanied with an audio output concentratedly), this allows the user to notice the generations of more interrupt events.

In addition, when the user does not use the electronic device for a predetermined period of time (when the user is deemed to not use a function accompanied with an audio output concentratedly), this allows the user to notice the generations of more interrupt events.

In addition, generally, because a case that the number of kinds of interrupt events to be reported is the biggest is an idle state, when the priority of a function accompanied with an audio output is lowered to the same priority as in the idle state, this allows the user to notice the generations of more interrupt events.

In addition, when the folding-type device is opened (when the user is deemed to use a function accompanied with an audio output concentratedly), the system allows the user to notice the generation of an interrupt event while suppressing a possibility that the operations performed by the user are suspended by the generation of a function accompanied with an audio output.

In addition, when the user uses the electronic device (when the user is deemed to use a function accompanied with an audio output concentratedly), the system allows the user to notice the generation of an interrupt event while suppressing a possibility that the operations performed by the user are suspended by the generation of a function accompanied with an audio output.

In addition, in the above-described embodiment, it detects changes in opening/closing of a folding device. However, it is not limited to the opening/closing only. For example, if the main body of the electronic device (mobile communication terminal) is a sliding-type, it may be designed to detect changes in slide-opening/closing. Namely, a content to be detected may vary with the form of the main body in an electronic device.

In addition, the functions, interrupt events and the like are not limited to what are taken up in the above-described embodiment. For example, the function may be a radio broadcast output function and the like, and the interrupt event may be an interrupt event reporting the exhaustion of a power supply battery in an electronic device (cellular phone) and the like.

In addition, the contents of interrupt processing are not limited to what are taken up in the above-described embodiment. For example, when an interrupt event of more priority than an operating state is generated, it may be designed to reserve a report without noticing the report and again report with "a reporting screen display+a reporting sound output", when the priority of the operating state is lower.

In addition, the electronic device as a terminal device is not limited to mobile communication terminals only, and may be applied to, for example, electronic devices such as PDA, electronic camera, electronic clock, music replay device likewise.

Furthermore, although the computer program product of the terminal device which is a preferred embodiment of the present invention is stored in the memory (for example, ROM, etc.) of the terminal device, this processing program is stored on a computer-readable medium and should also be protected in the case of manufacturing, selling, etc. of only the program. In that case, the method for protecting the program with a patent will be realized by the form of the computer-readable medium on which the computer program product is stored.

While the present invention has been described with reference to the preferred embodiments, it is intended that the invention be not limited by any of the details of the description therein but includes all the embodiments which fall within the scope of the appended claims.

What is claimed is:

1. A terminal apparatus for controlling processing on an interrupt event, based on a priority of a detected operating state of the terminal apparatus and a priority of the interrupt event, after detecting the operating state of the terminal apparatus, when the interrupt event is generated, comprising:
   a detecting means for detecting changes in use conditions of the terminal apparatus, the detecting means detecting that a folding mechanism or a sliding mechanism is closed as a change in the use conditions of the terminal apparatus;
   a judging means for judging whether a function accompanied with an audio output is in operation, when changes in the use conditions are detected by the detecting means; and
   a priority changing means for changing a priority of the function in operation while maintaining the audio output of the function in operation, when the function accompanied with the audio output is judged to be in operation by the judging means, the priority changing means lowering the priority of the function in operation while maintaining the audio output of the function in operation, when the function accompanied with the audio output is judged to be in operation by the judging means, and the priority changing means lowering the priority of the function in operation to the same priority as in an idle state.

2. The terminal apparatus according to claim 1, wherein the detecting means detects that a user operation is not performed for a predetermined period of time as a change in the use conditions of the terminal apparatus, and the priority changing means lowers the priority of the function in operation while maintaining the audio output of the function in operation, when the function accompanied with the audio output is judged to be in operation by the judging means.

3. The terminal apparatus according to claim 1, wherein the detecting means detects that the folding mechanism or sliding mechanism is opened as a change in the use conditions of the terminal apparatus, and the priority changing means raises the priority of the function in operation while maintaining the audio output of the function in operation, when the function accompanied with the audio output is judged to be in operation by the judging means.

4. A terminal apparatus for controlling processing on an interrupt event, based on a priority of a detected operating state of the terminal apparatus and a priority of the interrupt event, after detecting the operating state of the terminal apparatus, when the interrupt event is generated, comprising:
   a detecting means for detecting changes in use conditions of the terminal apparatus, the detecting means detecting that a user operation is performed as a change in the use conditions of the terminal apparatus;
   a judging means for judging whether a function accompanied with an audio output is in operation, when changes in the use conditions are detected by the detecting means; and
   a priority changing means for changing a priority of the function in operation while maintaining the audio output of the function in operation, when the function accompanied with the audio output is judged to be in operation by the judging means, the priority changing means raising the priority of the function in operation while maintaining the audio output of the function in operation, when the function accompanied with the audio output is judged to be in operation by the judging means.

5. A non-transitory computer-readable storage medium having a program of a terminal apparatus stored thereon that is executable by a computer for controlling processing on an interrupt event, based on a priority of a detected operating state of the terminal apparatus and a priority of an interrupt event, after detecting an operating state of the terminal apparatus, when the interrupt event is generated, comprising:
   a detection processing step of detecting a change in use conditions of the terminal apparatus, the detecting processing step detecting that a folding mechanism or a sliding mechanism is closed as a change in the use conditions of the terminal apparatus;
   a judging processing step of judging whether a function accompanied with an audio output is in operation, when changes in the use conditions are detected; and
   a priority change processing step of changing a priority of a function in operation while maintaining the audio output of the function in operation, when the function accompanied with the audio output is judged to be in operation, the priority change processing step lowering of the function in operation while maintaining the audio output of the function in operation, when the function accompanied with the audio output is judged to be in operation by the judging processing step, and the priority processing step lowering the priority of the function in operation to the same priority as in an idle state.

6. A non-transitory computer-readable storage medium having a program of a terminal apparatus stored thereon that is executable by a computer for controlling processing on an interrupt event, based on a priority of a detected operating state of the terminal apparatus and a priority of an interrupt event, after detecting an operating state of the terminal apparatus, when the interrupt event is generated, comprising:
   a detecting processing step of detecting changes in use conditions of the terminal apparatus, the detecting processing step detecting that a user operation is performed as a change in the use conditions of the terminal apparatus;

a judging processing step of judging whether a function accompanied with an audio output is in operation, when changes in the use conditions are detected by the detecting processing step; and a priority change processing step of changing a priority of the function in operation while maintaining the audio output of the function in operation, when the function accompanied with the audio output is judged to be in operation by the judging processing step, the priority change processing step raising the priority of the function in operation while maintaining the audio output of the function in operation, when the function accompanied with the audio output is judged to be in operation by the judging processing step.

* * * * *